US010992856B2

(12) United States Patent
Huang et al.

(10) Patent No.: US 10,992,856 B2
(45) Date of Patent: Apr. 27, 2021

(54) METHOD FOR DETECTING POSITION OF MOVABLE STRUCTURE, DETECTION COMPONENT, AND ELECTRONIC DEVICE

(71) Applicant: GUANGDONG OPPO MOBILE TELECOMMUNICATIONS CORP., LTD., Guangdong (CN)

(72) Inventors: Wentao Huang, Guangdong (CN); Zhouchuan Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/179,392

(22) Filed: Nov. 2, 2018

(65) Prior Publication Data

US 2019/0297251 A1     Sep. 26, 2019

(30) Foreign Application Priority Data

Mar. 20, 2018    (CN) .......................... 201810231695.2

(51) Int. Cl.
*H04N 5/232*      (2006.01)
*H04N 5/225*      (2006.01)
(Continued)

(52) U.S. Cl.
CPC .......... *H04N 5/23218* (2018.08); *G01D 5/02* (2013.01); *H04M 1/0237* (2013.01);
(Continued)

(58) Field of Classification Search
CPC .......... H04N 5/23218; H04N 5/23227; H04N 5/2252; H04N 5/2257; H04M 1/02; H04M 1/725
See application file for complete search history.

(56) References Cited

U.S. PATENT DOCUMENTS 7,777,679 B2 * 8/2010 Lim ..................... H04M 1/0245
                                                    343/702
8,275,420 B2 * 9/2012 Lim ..................... H04M 1/0235
                                                    455/566
(Continued)

FOREIGN PATENT DOCUMENTS

CN          202168120         3/2012
CN          102914933         2/2013
(Continued)

OTHER PUBLICATIONS

WIPO, English Translation of ISR/WO for PCT/CN2018/117248, dated Feb. 25, 2019.
(Continued)

*Primary Examiner* — Quan-Zhen Wang
*Assistant Examiner* — Mancil Littlejohn, Jr.
(74) *Attorney, Agent, or Firm* — Hodgson Russ LLP

(57) ABSTRACT

The present disclosure provides a method for detecting a position of a movable structure. The movable structure is applicable to an electronic device including a body and a detection component, and configured to move between a first position at which the movable structure is received in the body and a second position at which the movable structure extends out of the body. The detection component includes at least one distance sensor disposed on the movable structure. The at least one distance sensor is configured to be received in the body when the movable structure is at the first position and to protrude beyond the body when the movable structure is at the second position. The method includes: receiving a detection signal value outputted by the at least one distance sensor; and determining a position of the movable structure relative to the body according to the detection signal value.

13 Claims, 7 Drawing Sheets

(51) Int. Cl.
    *G01D 5/02*     (2006.01)
    *H04M 1/02*     (2006.01)

(52) U.S. Cl.
    CPC ........ H04M 1/0264 (2013.01); H04N 5/2252 (2013.01); H04N 5/2257 (2013.01); H04N 5/23227 (2018.08)

(56) References Cited

U.S. PATENT DOCUMENTS

| | | | | |
|---|---|---|---|---|
| 8,675,083 | B2* | 3/2014 | Kitagawa | H04B 5/0031 348/211.2 |
| 10,070,030 | B2* | 9/2018 | Evans, V | H04N 5/2254 |
| 2002/0136554 | A1* | 9/2002 | Nomura | G03B 17/00 396/448 |
| 2004/0184798 | A1* | 9/2004 | Dumm | F16M 11/18 396/428 |
| 2004/0266477 | A1* | 12/2004 | Murata | H04M 1/0212 455/556.1 |
| 2005/0014527 | A1* | 1/2005 | Chambers | H04M 1/0264 455/556.1 |
| 2007/0287504 | A1 | 12/2007 | Lim et al. | |
| 2014/0045559 | A1 | 2/2014 | Koppal et al. | |
| 2015/0189175 | A1* | 7/2015 | Fan et al. | H04N 5/23238 |
| 2017/0237884 | A1* | 8/2017 | Evans, V | H04M 1/72583 348/47 |

FOREIGN PATENT DOCUMENTS

| | | |
|---|---|---|
| CN | 102957763 | 3/2013 |
| CN | 205265787 | 5/2016 |
| CN | 106094990 | 11/2016 |
| CN | 107071242 | 8/2017 |
| CN | 206674128 | 11/2017 |
| GB | 2353361 | 2/2001 |

OTHER PUBLICATIONS

EPO, Office Action for EP Application No. 18208033.3, dated Jun. 7, 2019.
SIPO, First Office Action for CN Application No. 201810231695.2, dated Jun. 15, 2020.
SIPO, Second Office Action for CN Application No. 201810231695.2, dated Jul. 30, 2020.
IPI, Office Action for IN Application No. 201814044384, dated Dec. 8, 2020.
EPO, Communication for EP Application No. 18208033.3, dated Dec. 21, 2020.

* cited by examiner

| Preset signal value | 11 | 01 | 00 |
|---|---|---|---|
| Current relative position | A | C | B |

METHOD FOR DETECTING POSITION OF MOVABLE STRUCTURE, DETECTION COMPONENT, AND ELECTRONIC DEVICE

CROSS-REFERENCE TO RELATED APPLICATIONS

This application claims priority to Chinese Patent Application No. 201810231695.2, filed on Mar. 20, 2018, the entire disclosure of which is incorporated herein by reference.

FIELD

The present disclosure relates to an electronic technology field, and more particularly to a method for detecting a position of a movable structure, a detection component, and an electronic device.

BACKGROUND

A phone is a common electronic product in daily life. With higher and higher requirements on experience and feeling of a consumer to the phone, a screen-to-body ratio of the phone is critical for providing a good experience to the consumer, such that a large screen phone or even a full screen phone has been favored by more and more consumers. However, a front camera disposed on a front panel of a conventional phone may influence the screen-to-body ratio of the phone. Thus, how to reasonably dispose and use the front panel on the front panel becomes a technology challenge for improving the screen-to-body ratio of the phone.

DISCLOSURE

Embodiments of the present disclosure provide a method for detecting a position of a movable structure, a detection component, and an electronic device.

Embodiments of the present disclosure provide a method for detecting a position of a movable structure. The movable structure is applicable to an electronic device. The electronic device includes a body and a detection component. The movable structure is configured to move between a first position at which the movable structure is received in the body and a second position at which the movable structure extends out of the body. The detection component includes at least one distance sensor disposed on the movable structure. The at least one distance sensor is configured to be received in the body when the movable structure is at the first position and to protrude beyond the body when the movable structure is at the second position. The method includes receiving a detection signal value outputted by the at least one distance sensor; and determining a position of the movable structure relative to the body according to the detection signal value.

Embodiments of the present disclosure provide an electronic device. The electronic device includes a body; a movable structure, at least one distance sensor and a processor. The movable structure is configured to move between a first position at which the movable structure is received in the body and a second position at which the movable structure extends out of the body. The at least one distance sensor is disposed on the movable structure and is configured to be received in the body when the movable structure is at the first position and to protrude beyond the body when the movable structure is at the second position. The processor is configured to receive a detection signal value outputted by the at least one distance sensor; and determine a position of the movable structure relative to the body according to the detection signal value.

Embodiments of the present disclosure provide an electronic device. The electronic device includes a body, a movable structure, a driving motor and a detection component. The driving motor is configured to drive the movable structure to move between a first position at which the movable structure is received in the body and a second position at which the movable structure extends out of the body in response to a predetermined trigger signal. The detection component includes at least one distance sensor disposed on the movable structure. The at least one distance sensor is configured to received in the body when the movable structure is at the first position and to protrude beyond the body when the movable structure is at the second position, the detection component is configured to detect a position of the movable structure based on a detection signal value outputted by the at least one distance sensor.

The partial accompanying aspects and advantages of the present disclosure will be illustrated in the following description, which will be apparently, or be understood by the practice of the present disclosure in the following description.

BRIEF DESCRIPTION OF THE DRAWINGS

The above and/or accompanying aspects and advantages in the present disclosure will be more clearly and easy to understand with reference to the following of the embodiments described the accompanying drawings, in which.

EMBODIMENTS OF THE PRESENT DISCLOSURE

Figure 1:
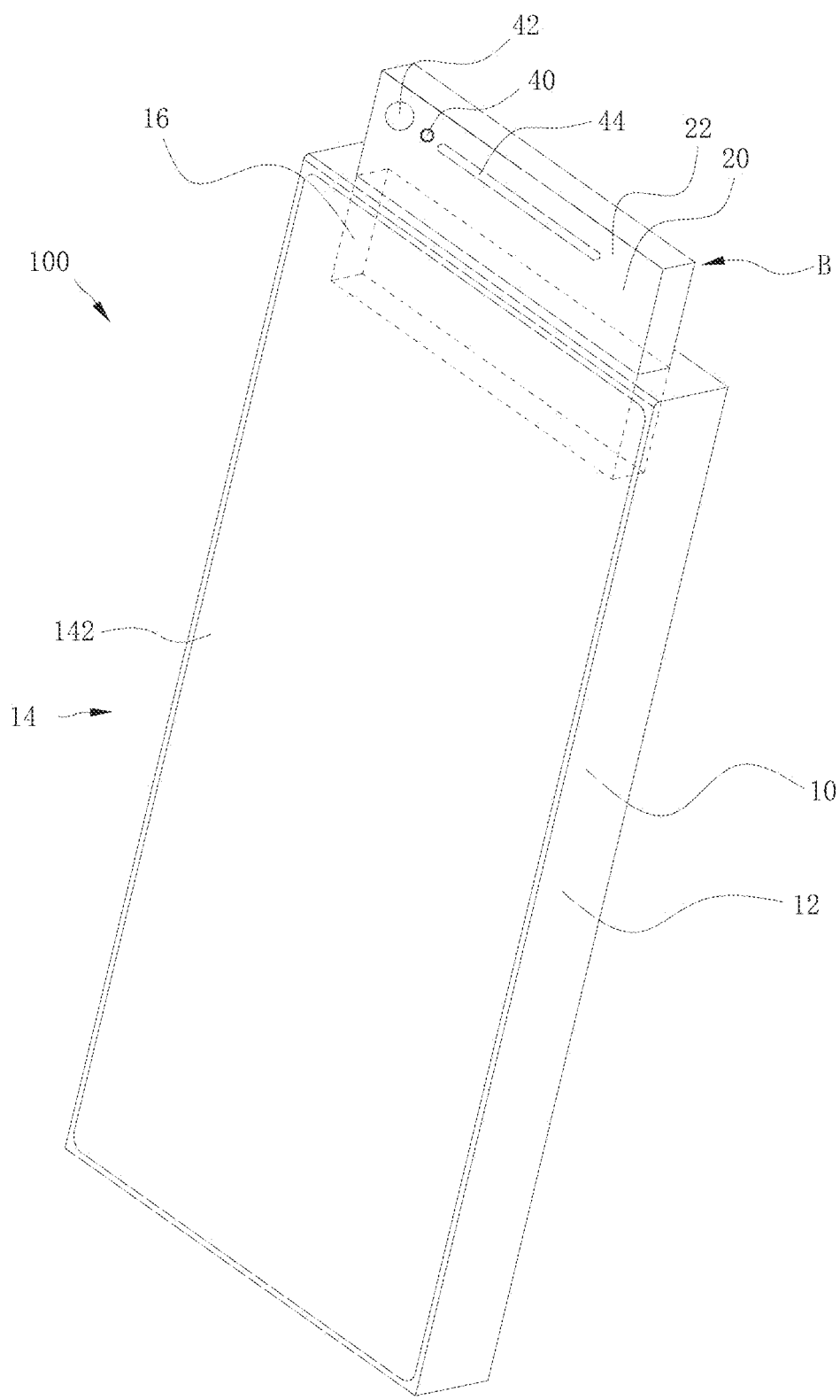
FIG. 1 is a schematic diagram of an electronic device when a movable structure is at a second position according to an embodiment of the present disclosure.
Figure 2:
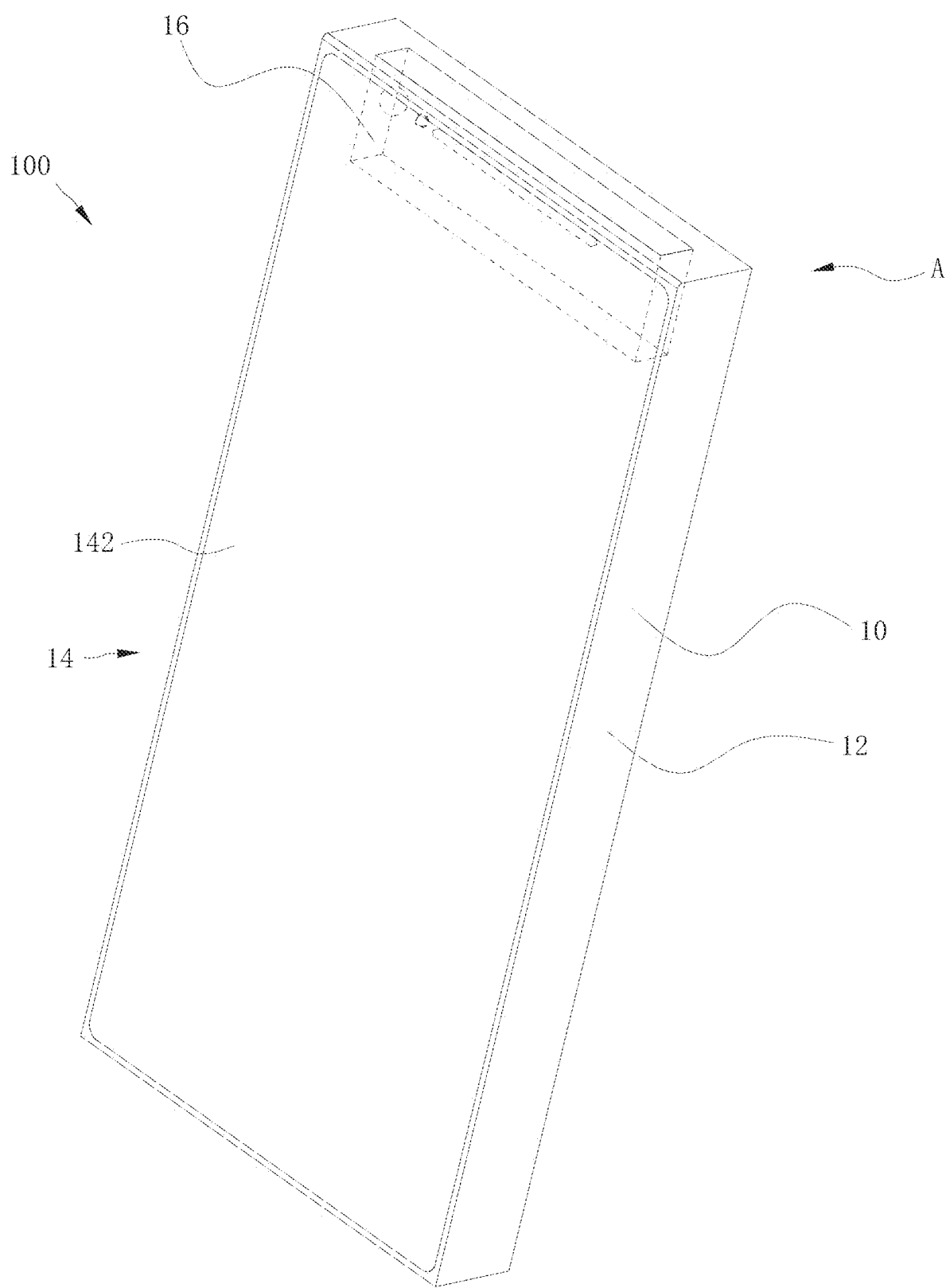
FIG. 2 is a schematic diagram of an electronic device when a movable structure is at a first position according to an embodiment of the present disclosure.
Figure 3:
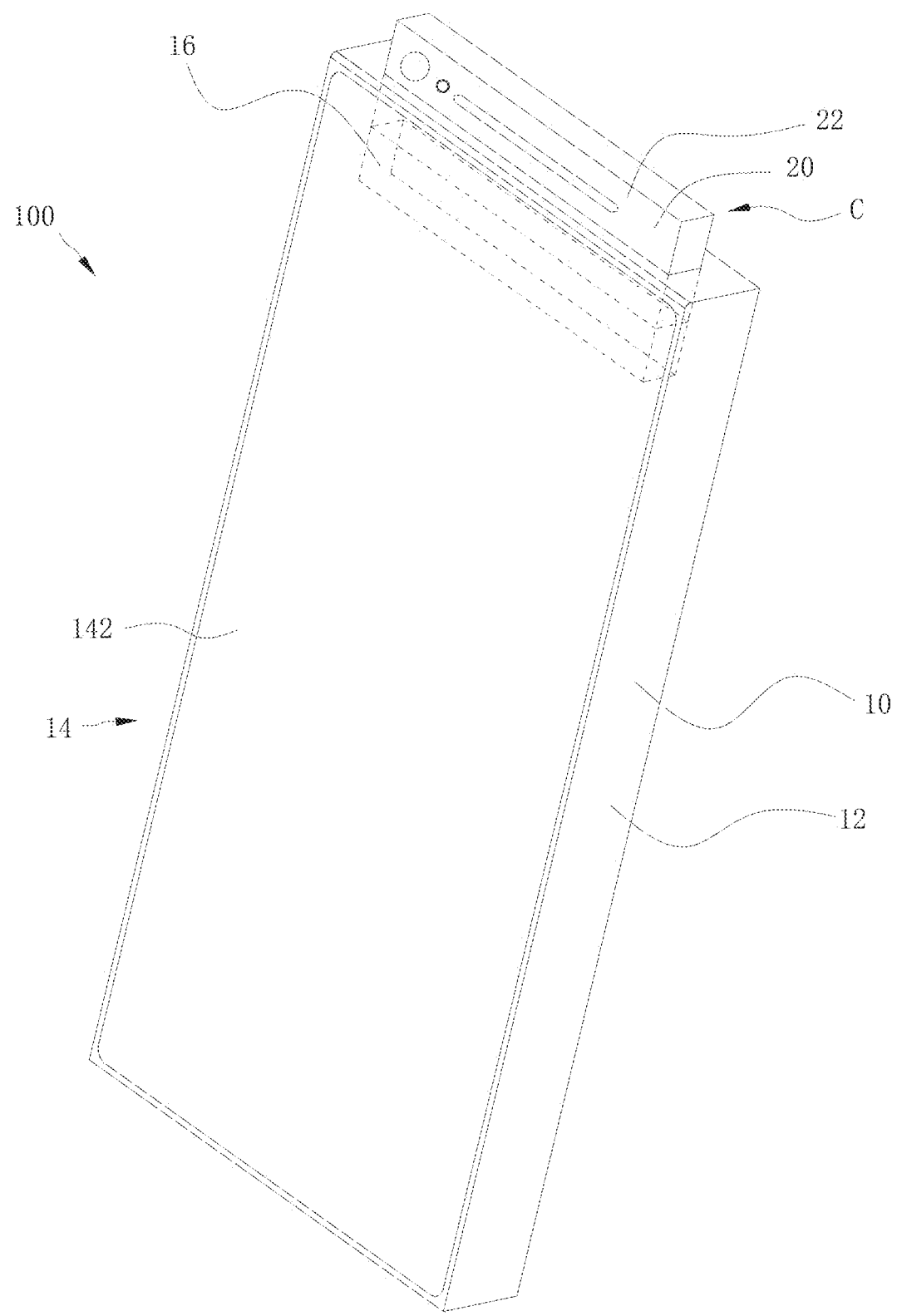
FIG. 3 is a schematic diagram of an electronic device when a movable structure is at a third position according to an embodiment of the present disclosure.

Reference will be made in details below to embodiments of the present disclosure, examples of which are illustrated in the accompanying drawings. The same or similar numbers represent the same or similar elements or elements with the same or similar function. Embodiments described below in the following accompanying drawings are exemplary, only for purpose of description of the present disclosure, but not constructed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

As illustrated in FIG. 1-FIG. 4, an electronic device 100 according to an embodiment of the present disclosure includes a body 10, a movable structure 20 and a detection component 30. The movable structure 20 is configured to move between a first position A at which the movable structure is received in the body 10 and a second position B at which the movable structure extends out of the body 10. The detection component 30 is configured to detect a position of the movable structure 20. The detection component 30 includes at least one distance sensor 32 and a processor 36. For convenience of description, take a first distance sensor 32 and a second distance sensor 34 being the at least one distance sensor as an example. The first distance sensor 32 and the second distance sensor 34 are spaced apart from each other on the movable structure 20 along a moving direction of the movable structure 20 towards the body 10. When the movable structure 20 is at the first position A, the first distance sensor 32 and the second distance sensor 34 are positioned in the body 10. When the movable structure 20 is at the second position B, at least the first distance sensor 32 protrudes beyond the body 10. The processor 36 is configured to receive detection signal values outputted by the first distance sensor 32 and the second distance sensor 34, and to determine a position of the movable structure 20 relative to the body 10 according to the detection signal values.

In some embodiments, the moving direction of the movable structure 20 refers to that the movable structure 20 moves to the inside or outside of the body 10. "The first distance sensor 32 and the second distance sensor 34 being spaced apart from each other on the movable structure 20 along a moving direction of the movable structure 20 towards the body 10" refers to that the first distance sensor 32 and the second distance sensor 34 may move to the inside or outside of the body 10 along with the movable structure 20, and may output the detection signal values according to changes in distances of the first distance sensor 32 and the second distance sensor 34 relative to the body. The positions of the first distance sensor 32 and the second distance sensor 34 are not limited to the aforementioned positions. In some embodiments, the first distance sensor 32 and the second distance sensor 34 can be disposed at any suitable positions of the movable structure 20 or the body 10 as long as the detection signal values can be outputted and received normally and steadily.

In some embodiments, the body 10 is provided with a sliding channel 16. At the first position A, the movable structure 20 is received in the sliding channel 16. In this way, the movable structure 20 moves between the first position A and the second position B through the sliding channel 16.

In detail, the body 10 includes a shell 12 and a display component 14. The shell 12 and the display component 14 together form an enclosure structure. The sliding channel 16 is disposed on the shell 12, such that the movable structure 20 may move out of or back to the body. In some embodiments, the sliding channel 16 can be provided at either side edge of the shell 12. In an embodiment, the sliding channel 16 is provided at a top edge of the shell 12, which is in accordance with the user habit.

The display component 14 includes a touch panel (not shown) and a cover 142. The touch panel includes a display module (not shown) and a touch layer (not shown) disposed on the display module. The display module may be, for example, a liquid crystal display module (LCM), or a flexible display module. The touch layer is configured to receive a touch input from a user to generate a signal for controlling the display module to display content and a signal for controlling the movable structure 20 to move.

The cover 142 may be made of transparent material, such as glass, ceramics or sapphire. Since the cover 142 is configured as an input element of the electronic device 100, the cover 142 is usually subjected to contacts, such as collision or scratching. For example, when the user puts the electronic device 100 in a pocket, the cover 142 may be damaged due to scratching of a key in the pocket. Therefore, the cover 142 may be made of the material with high rigidity, for example the aforementioned sapphire. In an embodiment, a hardened layer can be formed on a surface of the cover 142 to improve scratching resistance of the cover 142.

The touch panel may be adhered to the cover 142 through optically clear adhesive (OCA). The optically clear adhesive may further transmit light emitted by the touch panel in addition to fastening the touch panel and the cover 142 together.

Figure 5:
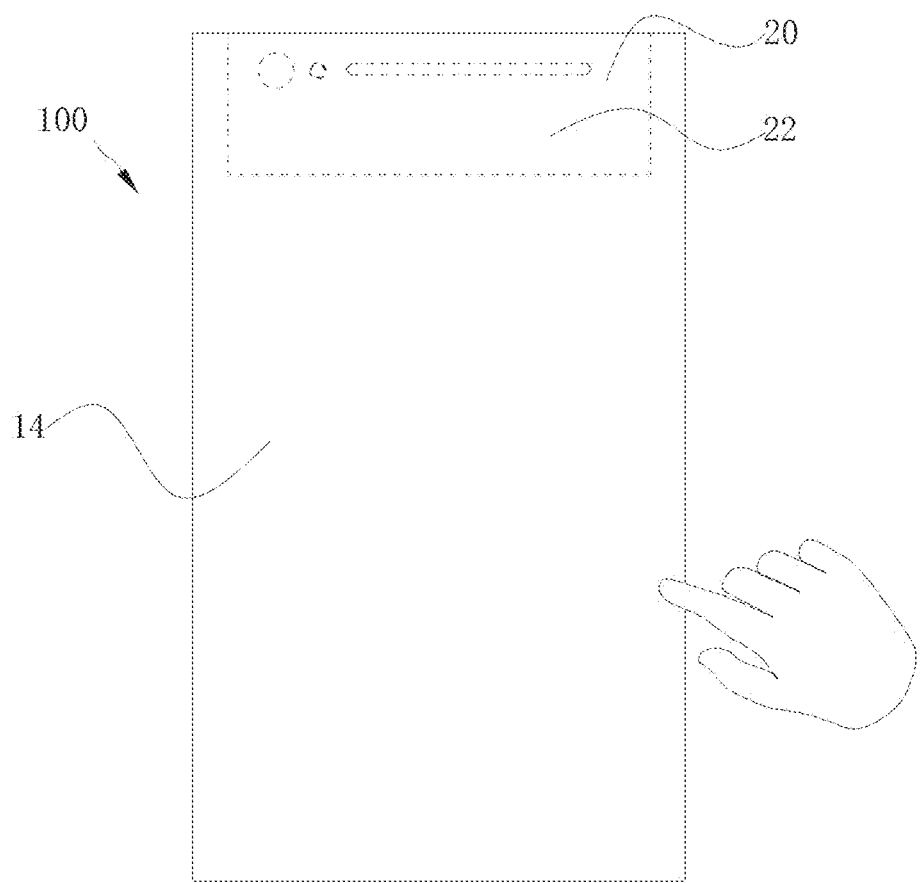
FIG. 5 is a schematic diagram illustrating a scene of using an electronic device according to an embodiment of the present disclosure.

As illustrated in FIG. 5, in some embodiments, the electronic device 100 includes a front camera 42. The movable structure 20 includes a carrier 22. The front camera 42 is disposed on the carrier 22. The front camera 42 may move along with the movable structure 20. In an embodiment, the user turning on or off the front camera 42 can be configured as a trigger signal. In other words, when the user turns on the front camera 42, the movable structure 20 is triggered to move out of the body. When the user turns off the front camera 42, the movable structure 20 is triggered to move back into the body. In this way, the user only needs to turn on or off the front camera 42 according to his or her old habit without performing further operations on the movable structure 20, which is convenient to the user.

In addition to the front camera 42, the carrier 22 may be provided with other functional components 40, for example a light and distance sensor, a proximity sensor and an earphone 44. The functional components 40 may protrude beyond the body 10 with the movable structure 20 moving out of the body 10 according to a user input, such that the functional components 40 may operate normally. Additionally, the functional components 40 may be received in the body 10 with the movable structure 20 moving back into the body 10 according to a user input. In this way, it is possible to provide as little through-holes as possible on the display component 14, such that a design requirement of full screen of the electronic device 100 can be satisfied.

Figure 6:
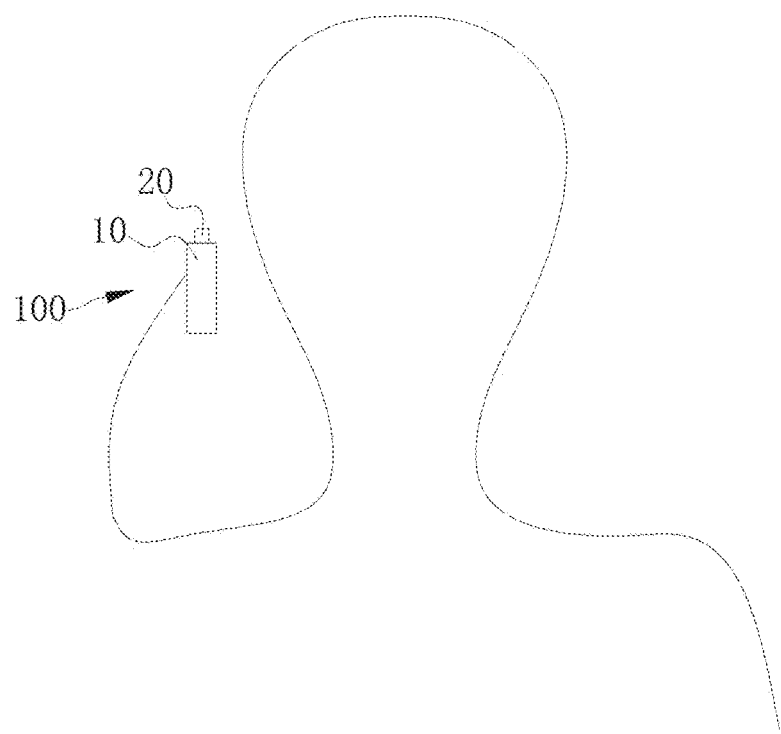
FIG. 6 is a schematic diagram illustrating another scene of using an electronic device according to an embodiment of the present disclosure.

As illustrated in FIG. 6, when the carrier 22 is provided with the light and distance sensor, the light and distance sensor may be disposed at a top of the carrier 22. In other words, when the movable structure 20 is completely received in the sliding channel 16, the light and distance sensor may still protrude from the top of the carrier 22, to sense light in real time. When the carrier 22 is provided with the proximity sensor and the earphone 44, the user answering or hanging up a call can be configured as the trigger signal. In other words, when the user answers a call, the movable structure 20 is triggered to move out of the body. When the user hangs up the call, the movable structure 20 is triggered to move back into the body. In this way, the user only needs answer or hung up the call according to his or her old habit without performing further operations on the movable structure 20, which is convenient to the user.

In some embodiments, a plurality of functional components 40 can be disposed on a same carrier 22 or a plurality of carriers 22. When the plurality of functional components 40 are disposed on the same carrier 22, the plurality of functional components 40 can be arranged along the moving direction, such that the processor 36 may control a functional component 40 at a lower portion of the carrier 22 to protrude beyond the body by controlling a moving distance of the movable structure 20. When the plurality of functional components 40 are disposed on the plurality of carriers 22, the processor 36 may select a functional component 40 to protrude beyond the body by controlling a movement of a carrier 22. In this way, the user can be provided with several moving ways, such that the user may select the moving way according to different scenes and requirements.

Figure 7:
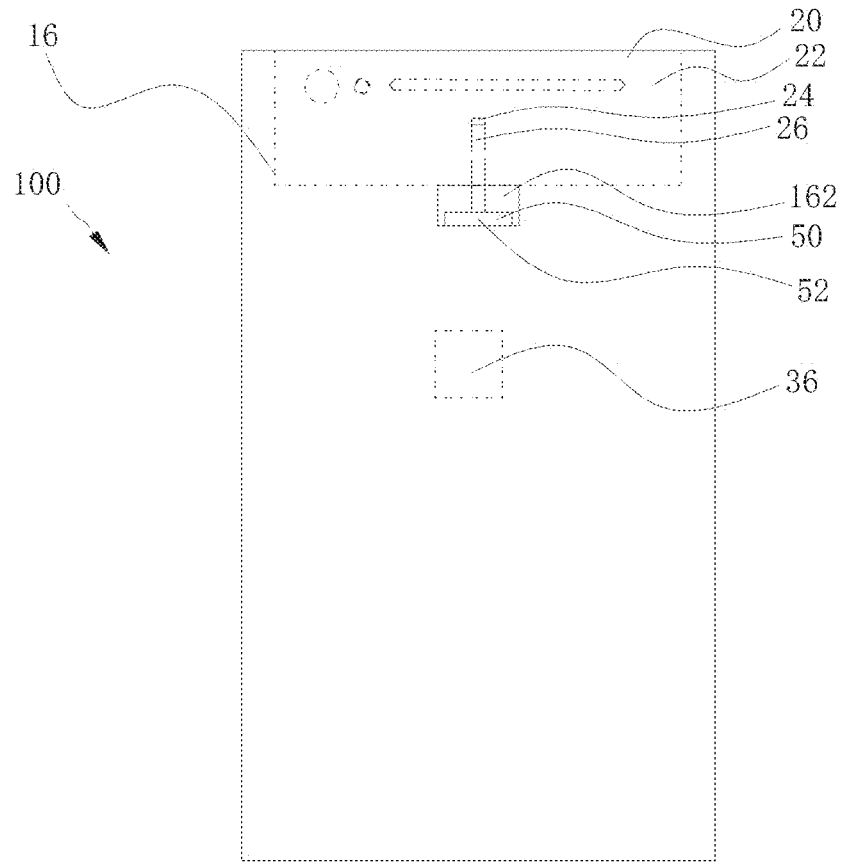
FIG. 7 is a block diagram of an electronic device according to an embodiment of the present disclosure.

As illustrated in FIG. 7, in some embodiments, the movable structure 20 includes a threaded hole 24 disposed at a middle portion of the carrier 22 and a turning screw 26 engaged with the threaded hole 24. The sliding channel 16 includes a groove 162 disposed corresponding to the threaded hole 24 and at a base of the sliding channel 16. The electronic device 100 includes a driving device 50 disposed in the groove 162. The driving device 50 includes a driving motor 52 coupled to the processor 36 and an output shaft coupled to a bottom of the turning screw 26.

In some embodiments, the processor 36 may control the movable structure 20 to move by controlling the driving motor 52. When the user instructs the movable structure 20 to move from the first position A to the second position B, the processor 36 controls the driving motor 52 to rotate forward, such that the output shaft may drive the turning screw 26 to rotate in the threaded hole 24 and thus the movable structure 20 may move from the first position A to the second position B. When the user instructs the movable structure 20 to move from the second position B to the first position A, the processor 36 controls the driving motor 52 to rotate backward, such that the output shaft may drive the turning screw 26 to rotate in the threaded hole 24 and thus the movable structure 20 may move from the second position B to the first position A. "Moving from the first position A to the second position B" and "moving from the second position B to the first position A" refers to a moving direction rather than a starting point and an ending point of a movement.

The electronic device 100 according to an embodiment of the present disclosure employs the first distance sensor 32 and the second distance sensor 34 to determine a current relative position of the movable structure 20. When the functional component 40 such as the front camera 42 is disposed on the movable structure 20, a state of the movable structure 20 can be detected in real time to determine a position of the functional component 40.

The functional component 40 such as the front camera 42 needs to protrude beyond the body 10, otherwise the functional component 40 cannot operate normally. The electronic device 100 according to an embodiment of the present disclosure has the functional component 40 disposed on the movable structure, such that the functional component 40 can be received in the body 10 when functional component 40 needs not to operate and the functional component 40 can protrude beyond the body 10 along with the movable structure 20 when functional component 40 needs to operate. In this way, it is unnecessary to provide on the display component 14 the through-hole through which the functional component 40 such as the front camera 42 can be exposure, such that a screen-to-body ratio can be increased, thus improving user experience.

Figure 8:
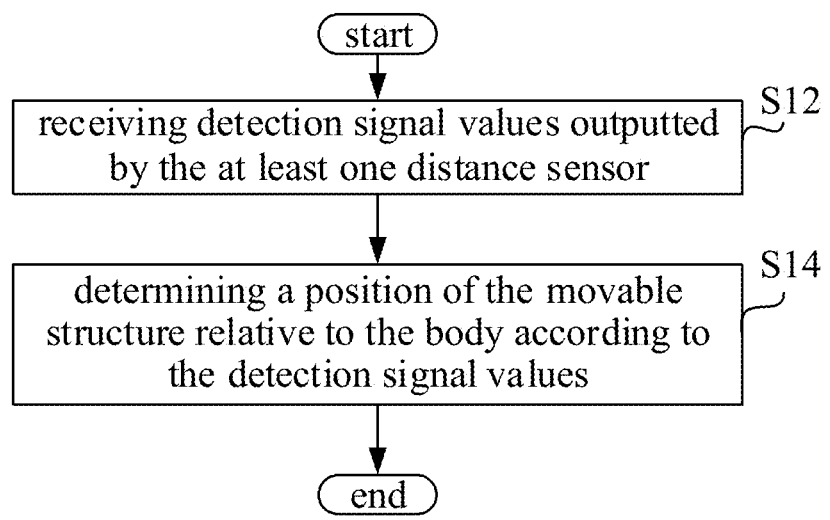
FIG. 8 is a flow chart illustrating a method for detecting a position according to an embodiment of the present disclosure.

As illustrated in FIG. 8, the present disclosure provides a method for detecting a position of the movable structure 20. The method for detecting the position of movable structure 20 according to an embodiment of the present disclosure can be used to detect the position of the movable structure 20 of the electronic device 100 according to the embodiment of the present disclosure. The electronic device 100 includes a body 10 and a detection component 30. The movable structure 20 is configured to move between a first position A at which the movable structure 20 is received in the body 10 and a second position B at which the movable structure 20 extends out of the body 10. The detection component 30 includes a first distance sensor 32 and a second distance sensor 34. The first distance sensor 32 and the second distance sensor 34 are spaced apart from each other on the movable structure 20 along a moving direction of the movable structure 20 towards the body 10. The method includes the followings.

At block S12, detection signal values outputted by the first distance sensor 32 and the second distance sensor 34 are received.

At block S14, a position of the movable structure 20 relative to the body 10 is determined according to the detection signal values.

Figure 4:
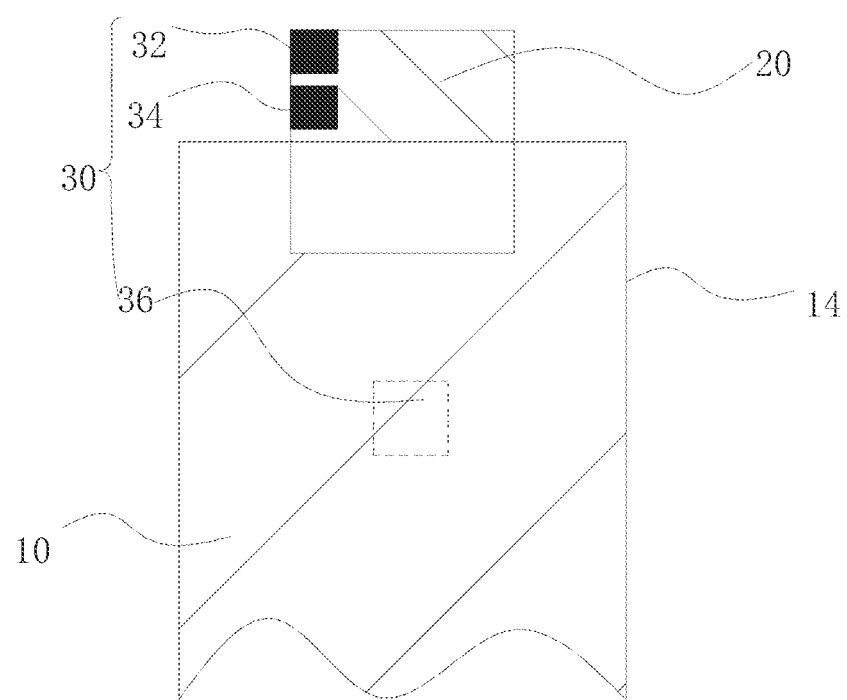
FIG. 4 is a block diagram of an electronic device according to an embodiment of the present disclosure.

As illustrated in FIG. 4, the present disclosure provides a detection component 30. The detection component 30 includes a processor 36. The processor 36 is configured to receive the detection signal values outputted by the first distance sensor 32 and the second distance sensor 34 and to determine the position of the movable structure 20 relative to the body 10 according to the detection signal values.

With the method for detecting the position of the movable structure 20 and the detection component 30 according to embodiments of the present disclosure, the first distance sensor 32 and the second distance sensor 34 are used to determine the current relative position of the movable structure 20. When the movable structure 20 is provided with the functional component 40 such as the front camera 42, a state of the movable structure 20 can be detected in real time, such that the position of the functional component 40 can be determined.

An operation principle of the method for detecting the position of the movable structure 20 and the detection component 30 according to the embodiments of the present disclosure is mainly based on a characteristic of distance detection of each of the first distance sensor 32 and the second distance sensor 34. The distance sensor includes an infrared transmitter tube and an infrared receiver tube. When infrared ray emitted by the infrared transmitter tube is received by the infrared receiver tube in a short time, it indicates a short distance. When the infrared ray emitted by the infrared transmitter tube is received by the infrared receiver tube in a long time, it indicates a long distance. In an embodiment of the present disclosure, the detected distances refer to relative distances between the body 10 and the first distance sensor 32 and between the body 10 and the second distance sensor 34.

When the movable structure 20 is received in the body 10, the infrared ray emitted by the first distance sensor 32 and the second distance sensor 34 collides with an internal wall of the sliding channel 16, and is reflected by the internal wall and is received by a receiver, it spends a short time due to the short distance and the spent time is set as a time limit, in this case the movable 20 is considered to be at the first position A. When the movable structure 20 extends out of the body 10, there may be two cases: in the first case, the first distance sensor 32 protrudes beyond the body 10 but the second distance sensor 34 is still at a part of the movable structure 20 received in the body 10; in the second case, both the first distance sensor 32 and the second distance sensor 34 are at the part of the movable structure 20 extending out of the body 10. In the above two cases, it takes a long time for the receiver tube to receive the infrared ray emitted by the transmitter tube, or even it is possible that the receiver tube cannot receive the reflected infrared ray, such that the spent time exceeds the time limit. For the later case, it takes more time than the former case, and the movable structure 20 is considered to be at the second position B. For the former case, the movable structure 20 is considered to be at a third position C which is between the first position A and the second position B.

The distances of the first distance sensor 32 and the second distance sensor 34 relative to the body 10 can be determined according to a sum of the time spent by the first distance sensor 32 for distance detection and the time spent by the second distance sensor 34 for distance detection. Since a length of the time spent by the first distance sensor 32 and a length of the time spent by the second distance sensor 34 are related to the positions of the first distance sensor 32 and the second distance sensor 34 and related to lengths of corresponding distances, the longer the moving distance of the movable structure 20 is, the longer the spent time is. By determining the length of the time spent by the first distance sensor 32 and the time spent by the second distance sensor 34, it may be determined whether the movable structure 20 is at the first position A, the second position or the third position C. The relative positions of the first distance sensor 32 and the second distance sensor 34 can be determined according to the signals outputted by the first distance sensor 32 and the second distance sensor 34.

Further, the position of the movable structure 20 relative to the body 10 can be determined indirectly by determining the positions of the first distance sensor 32 and the second distance sensor 34 relative to the body 10. In this way, the state of the movable structure 20 can be detected simply and conveniently.

In some embodiments, block S14 includes: acquiring a database, the database comprising a plurality of preset signal values and a plurality of nominal positions having a one-to-one correspondence with the plurality of preset signal values; and querying the database with the detection signal value to acquire the position of movable structure relative to the body.

In some embodiments, the processor 36 is configured to acquire a database, the database comprising a plurality of preset signal values and a plurality of nominal positions having a one-to-one correspondence with the plurality of preset signal values; and to query the database with the detection signal value to acquire the position of movable structure relative to the body.

Since one preset signal value corresponds to one nominal position, i.e., each preset signal value has one and only one corresponding nominal position, data about a detection signal value can be read out of the database according to the detection signal value, such that the current relative position can be determined according to the detection signal value.

In some embodiments, the method further includes: controlling the movable structure 20 to move to each nominal position; and acquiring signal values outputted by the first distance sensor 32 and the second distance sensor 34 corresponding to the nominal position to obtain the preset signal value corresponding to the nominal position.

In some embodiments, the processor 36 is configured to: control the movable structure 20 to move to each nominal position; and acquire signal values outputted by the first distance sensor 32 and the second distance sensor 34 corresponding to the nominal position to obtain the preset signal value corresponding to the nominal position.

By recording the nominal position and the detection signal values outputted by the first distance sensor 32 and the second distance sensor 34 corresponding to the nominal position, a correspondence between the position of the movable structure 20 and the detection signal values outputted by the first distance sensor 32 and the second distance sensor 34 can be acquired. In this way, in a subsequent process, as long as the detection signal values outputted by the first distance sensor 32 and the second distance sensor 34 are acquired, the position of the movable structure 10 relative to the body 10 can be derived according to the determined correspondence.

Figures 9, 10:
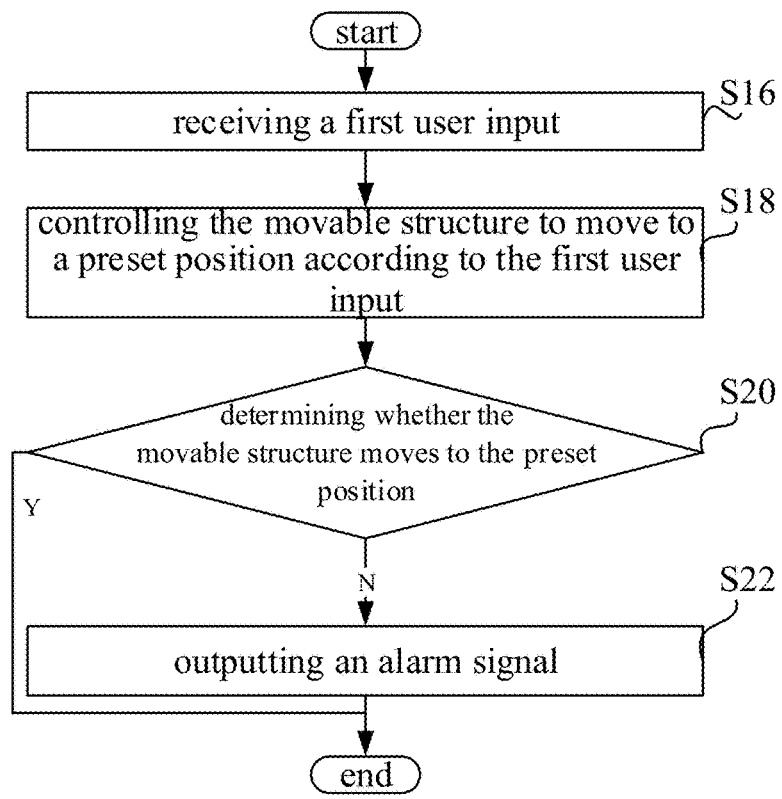
FIG. 9 is a schematic diagram illustrating a relation curve of nominal positions to preset signal values according to an embodiment of the present disclosure.
FIG. 10 is a flow chart illustrating a method for detecting a position according to another embodiment of the present disclosure.

As illustrated in FIG. 9, in some embodiments, the method includes: associating the plurality of preset signal values with the plurality of nominal positions to generate a query table; or performing a fitting on the plurality of preset signal values and the plurality of nominal positions to generate a relation curve.

In some embodiments, the processor 36 is configured to: associate the plurality of preset signal values with the plurality of nominal positions to generate a query table; or perform a fitting on the plurality of preset signal values and the plurality of nominal positions to generate a relation curve.

Accordingly, in order to facilitate storing and querying, the correspondence between the nominal position of the movable structure 20 and the detection signal values configured as the preset signal value and outputted by the first distance sensor 32 and the second distance sensor 34 is more accurate. In practical detection process, it is possible that the movable structure 20 does not move to the nominal position exactly but moves to the third position C between two nominal positions. In this case, the result obtained by directly adopting the preset signal value corresponding to the nominal position is not exact. An average value of two nominal positions or a value obtained by synthetic weighting the two nominal positions can be used to determine the current relative position of the movable structure 20. Given that the plurality of preset signal values may not vary linearly, a fitting is performed on the plurality of preset signal values and the plurality of nominal positions to generate the relation curve, such that the accuracy of the current relative position determined according to the plurality of preset signal values and the plurality of nominal positions can be ensured as far as possible.

In an embodiment of the present disclosure, as illustrated in FIG. 9, the detection signal value is a logic value. When the receiver tube receives the infrared ray emitted by the transmitter tube and the shortest length of time is set as a time limit, the logic values outputted by the first distance sensor 32 and the second distance sensor 34 are both "1". When the length of time spent by a distance sensor (the first distance sensor or the second distance sensor) is greater than the time limit, the outputted logic value of the distance sensor is "0". The outputted logic value of the first distance sensor is placed in front of the outputted logic value of the second distance sensor. When both the first distance sensor 32 and the second distance sensor 34 receive the reflected infrared ray, the outputted logic values are both "1", it indicates that the movable structure 20 is at the first position A and thus is received in the body 10. When the outputted logic values are "0" and "1", it indicates that the movable structure 20 is at the third position C. When the outputted logic values are both "0", it indicates that the movable structure 20 extends out of the body 10.

As illustrated in FIG. 10, in some embodiments, the method includes the followings.

At block S16, a first user input is received.

At block S18, the movable structure 20 is controlled to move to a preset position according to the first user input.

In some embodiments, the processor 36 is configured to receive a first user input and control the movable structure 20 to move to the preset position.

In this way, the movement of the movable structure can be realized. As described above, the processor 36 may control the movement of the movable structure 20 by controlling the driving motor 52 according to the user input. When the processor 36 receives the first user input, the processor 36 controls the driving motor 52 to rotate forward or backward, such that the output shaft drives the turning screw 26 to rotate in the threaded hole 24 and thus the movable structure 20 moves to the preset position.

A trigger signal can be set to cause the processor 36 to control the movable structure 20 to move in particular situations. For example, when the carrier 22 is provided with the proximity sensor and the earphone 44, the user answering or hanging up a call is configured as the trigger signal. In other words, when the user answers a call, the movable structure 20 is triggered to move out of the body automatically. When the user hangs up the call, the movable structure 20 is triggered to move back into the body automatically. In summary, the movable structure 20 can move based on the user's operations or can move automatically in particular situations. The user can set the particular situations in which the movable structure 20 can move automatically.

In some embodiments, the method includes the followings.

At block S20, it is determined whether the movable structure 20 moves to the preset position.

At block S22, when the movable structure 20 does not move to the preset position, an alarm signal is outputted.

In some embodiments, the processor 36 is configured to: determine whether the movable structure 20 moves to the preset position, and output the alarm signal when the movable structure 20 does not move to the preset position.

In this way, the user may be prompted to get involved to avoid affecting functions of the movable structure 20 or the body 10 or damaging the movable structure 20 or the body 10 when the movable structure 20 or the body 10 does not move to the preset position.

Due to the complexity of actual situations, the movable structure 20 may be blocked, such that the movable structure 20 may not move to the preset position. If no response such as determination and alarm is made to abnormal situations, barriers causing the abnormal situations cannot be cleared. In addition, when the movable structure 20 is blocked and the barriers cannot be cleared for a long time, the driving motor 52 continues operating, such that the movable structure 20 or the body may be damaged. When the abnormal situations occur, an alarm mechanism can cause the processor 36 to perform corresponding operations on time, for example turning off the driving motor 52, to avoid damage to the movable structure 20 or the body 10.

In some embodiments, block S20 includes: receiving a plurality of detection signal values outputted by the first distance sensor 32 and the second distance sensor 34 in a preset time period; determining a preset signal value corresponding to the preset position; determining whether the preset signal value is consistent with at least one of the plurality of detection signal values; and when the preset signal value is inconsistent with each of the plurality of detection signal values, determining that the movable structure 20 does not move to the preset position.

In some embodiments, the processor 36 is configured to: receive a plurality of detection signal values outputted by the first distance sensor 32 and the second distance sensor 34 in the preset time period; determining the preset signal value corresponding to the preset position; determining whether the preset signal value is consistent with at least one of the plurality of detection signal values; and when the preset signal value is inconsistent with each of the plurality of detection signal values, determining that the movable structure 20 does not move to the preset position.

In this way, a determination of whether the movable structure 20 moves to the preset position can be realized.

When the plurality of detection signal values are consistent with each other in the preset time period, it indicates that the movable structure 20 is in a static state. The static state may be caused by two cases: in the first case, the movable structure 20 moves to the preset position and stops moving normally; in the second case, the movable structure 20 does not move to the preset position but stops moving abnormally. By comparing the plurality of detection signal values with the preset signal value corresponding to the preset position, it may be determined whether the movable structure 20 moves to the preset position, so as to determine whether the abnormal situations occur.

The current relative position of the movable structure 20 can be determined according to a plurality of consistent detection signal values. By comparing the current relative position with the preset position, it may be determined whether the movable structure 20 moves to the preset position, so as to determine whether the abnormal situations occur.

In some embodiments, the method includes: receiving a second user input; and controlling the movable structure 20 to continue moving to the preset position according to the second user input.

In some embodiments, the processor 36 is configured to: receive a second user input; and control the movable structure 20 to continue moving to the preset position according to the second user input.

Accordingly, in the case that the movable structure 20 does not move to the preset position, the movable structure 20 can move from the current position at which the abnormal situation occurs to the preset position after the barrier is cleared by the user.

In some embodiments, the method includes: receiving a third user input; and controlling the movable structure 20 to move to the first position A according to the third user input.

In some embodiments, the processor 36 is configured to: receive a third user input; and control the movable structure 20 to move to the first position A according to the third user input.

Accordingly, in the case that the movable structure 20 does not move to the preset position, the movable structure 20 can move from the current position at which the abnormal situation occurs to the first position A after the barrier is cleared by the user, such that a resetting of the movable structure is realized.

In practical operations, the display component 14 may display icons corresponding to the operations of moving to the preset position and moving to the first position A. The user may select to perform one of the two operations through the display component 14. In other words, after the abnormal situation occurs, the user may select to move the movable structure from the current position at which the abnormal situation occurs to the preset position or to the first position A.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although the present disclosure has been described in detail with reference to the foregoing embodiments, those skilled in the art should understand that, the technical solutions described in respective embodiments above may be modified, or some of technical features may be equivalently replaced; however, these modifications or replacements do not deviate the essence of the corresponding technical solutions from the scope of the technical solutions of embodiments of the present disclosure.

What is claimed is:

1. A method for detecting a position of a movable structure, wherein the movable structure is applicable to an electronic device, the electronic device comprises a body and a detection component, the movable structure is configured to move between a first position at which the movable structure is received in the body and a second position at which the movable structure extends out of the body, the detection component comprises at least one distance sensor disposed on the movable structure, the at least one distance sensor is configured to be received in the body when the movable structure is at the first position and to protrude beyond the body when the movable structure is at the second position, wherein the method comprises:
  receiving a detection signal value outputted by the at least one distance sensor;
  determining a position of the movable structure relative to the body according to the detection signal value;
  wherein determining the position of the movable structure relative to the body according to the detection signal value comprises:
    acquiring a database, the database comprising a plurality of preset signal values and a plurality of nominal positions having a one-to-one correspondence with the plurality of preset signal values; and
    querying the database with the detection signal value to acquire the position of movable structure relative to the body;
  wherein the method further comprises:
    controlling the movable structure to move to each nominal position; and
    acquiring a signal value outputted by the at least one distance sensor corresponding to the nominal position as the preset signal value corresponding to the nominal position;
  wherein the method further comprises at least one of following operations:
    associating the plurality of preset signal values with the plurality of nominal positions to generate a query table; and
    performing a fitting on the plurality of preset signal values and the plurality of nominal positions to generate a relation curve.

2. The method according to claim 1, wherein determining whether the movable structure moves to the preset position comprises:
  receiving a plurality of detection signal values outputted by the at least one distance sensor in a preset time period;

determining a preset signal value corresponding to the preset position;

determining whether the preset signal value is consistent with at least one of the plurality of detection signal values; and when the preset signal value is inconsistent with each of the plurality of detection signal values, determining that the movable structure does not move to the preset position.

3. The method according to claim 1, further comprising:
receiving a user input; and
controlling the movable structure to continue moving to the preset position according to the user input.

4. The method according to claim 1, further comprising:
receiving a user input; and
controlling the movable structure to move to the first position according to the user input.

5. The method according to claim 1, further comprising:
receiving a user input;
controlling the movable structure to move to a preset position according to the user input.

6. The method according to claim 5, further comprising:
determining whether the movable structure moves to the preset position; and
when the movable structure does not move to the preset position, outputting an alarm signal.

7. An electronic device, comprising:
a body;
a movable structure, configured to move between a first position at which the movable structure is received in the body and a second position at which the movable structure extends out of the body;
at least one distance sensor, disposed on the movable structure, and configured to be received in the body when the movable structure is at the first position and to protrude beyond the body when the movable structure is at the second position;
a processor, configured to:
receive a detection signal value outputted by the at least one distance sensor; and
determine a position of the movable structure relative to the body according to the detection signal value;
wherein the processor is further configured to:
acquire a database, the database comprising a plurality of preset signal values and a plurality of nominal positions having a one-to-one correspondence with the plurality of preset signal values; and
query the database with the detection signal value to acquire the position of movable structure relative to the body;
wherein the processor is further configured to:
control the movable structure to move to each nominal position; and
acquire a signal value outputted by the at least one distance sensor corresponding to the nominal position as the preset signal value corresponding to the nominal position;
wherein the processor is further configured to perform at least one of following operations:
associating the plurality of preset signal values with the plurality of nominal positions to generate a query table; and
performing fitting on the plurality of preset signal values and the plurality of nominal positions to generate a relation curve.

8. The electronic device according to claim 7, wherein the processor is further configured to:

receive a plurality of detection signal values outputted by the at least one distance sensor in a preset time period;
determine a preset signal value corresponding to the preset position;
determine whether the preset signal value is consistent with at least one of the plurality of detection signal values; and
when the preset signal value is inconsistent with each of the plurality of detection signal values, determine that the movable structure does not move to the preset position.

9. The electronic device according to claim 7, wherein the processor is further configured to:
receive a user input; and
control the movable structure to continue moving to the preset position according to the user input.

10. The electronic device according to claim 7, wherein the processor is further configured to:
receive a user input; and
control the movable structure to move to the first position according to the user input.

11. The electronic device according to claim 7, wherein the processor is further configured to:
receive a user input;
control the movable structure to move to a preset position according to the user input.

12. The electronic device according to claim 11, wherein the processor is further configured to:
determine whether the movable structure moves to the preset position; and
when the movable structure does not move to the preset position, output an alarm signal.

13. An electronic device, comprising: a body, a movable structure, a driving motor, a detection component; wherein
the driving motor is configured to drive the movable structure to move between a first position at which the movable structure is received in the body and a second position at which the movable structure extends out of the body in response to a predetermined trigger signal; and
the detection component comprises at least one distance sensor disposed on the movable structure, wherein the at least one distance sensor is configured to be received in the body when the movable structure is at the first position and to protrude beyond the body when the movable structure is at the second position, the detection component is configured to detect a position of the movable structure based on a detection signal value outputted by the at least one distance sensor by acquiring a database, the database comprising a plurality of preset signal values and a plurality of nominal positions having a one-to-one correspondence with the plurality of preset signal values and querying the database with the detection signal value to acquire the position of movable structure relative to the body;
wherein the detection component comprises a first distance sensor and a second distance sensor, wherein the first distance sensor and the second distance sensor are spaced apart from each other on the movable structure along a moving direction of the movable structure towards the body;
wherein the driving motor is further configured to drive the movable structure to move to each nominal position and the detection component is further configured to acquire a signal value outputted by the at least one distance sensor corresponding to the nominal position as the preset signal value corresponding to the nominal position and to associate the plurality of preset signal values with the plurality of nominal positions to generate a query table or to perform a fitting on the plurality of preset signal values and the plurality of nominal positions to generate a relation curve.

* * * * *